United States Patent
Wokaty, Jr.

(10) Patent No.: US 12,475,465 B2
(45) Date of Patent: Nov. 18, 2025

(54) SYSTEMS AND METHODS FOR GENERATION AND USE OF BIOMETRIC-BASED ACCOUNT NUMBERS

(71) Applicant: Capital One Services, LLC, McLean, VA (US)

(72) Inventor: Robert Dwane Wokaty, Jr., Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 146 days.

(21) Appl. No.: 18/154,236

(22) Filed: Jan. 13, 2023

(65) Prior Publication Data
US 2024/0242220 A1    Jul. 18, 2024

(51) Int. Cl.
*G06Q 20/40* (2012.01)

(52) U.S. Cl.
CPC ... *G06Q 20/40145* (2013.01); *G06Q 20/4018* (2013.01)

(58) Field of Classification Search
USPC .......................................................... 705/44
See application file for complete search history.

(56) References Cited

U.S. PATENT DOCUMENTS

| | | | | |
|---|---|---|---|---|
| 6,915,279 | B2 * | 7/2005 | Hogan | G06Q 20/367 705/64 |
| 8,461,961 | B2 * | 6/2013 | Wu | G06F 21/34 340/5.82 |
| 8,549,599 | B2 * | 10/2013 | Semba | G06V 40/1365 713/186 |
| 10,552,637 | B1 * | 2/2020 | Phillips | G06Q 40/06 |

(Continued)

FOREIGN PATENT DOCUMENTS

| | | | | |
|---|---|---|---|---|
| EP | 2418603 A1 | * | 2/2012 | ......... H04L 63/0861 |
| KR | 102630287 B1 | * | 1/2024 | ........... G06Q 20/351 |
| WO | WO-2009001020 A1 | * | 12/2008 | .......... H04W 12/068 |
| WO | WO-2019032113 A1 | * | 2/2019 | ............. G06Q 20/32 |

OTHER PUBLICATIONS

Title: Cryptography key generation using biometrics Authors: Sashank Singhvi, R. et al. Date: Jun. 1, 2009 (Year: 2009).*

(Continued)

*Primary Examiner* — Bennett M Sigmond
*Assistant Examiner* — Yongsik Park
(74) *Attorney, Agent, or Firm* — Bookoff McAndrews, PLLC

(57) ABSTRACT

Disclosed are methods and systems for generating and using biometric-based account numbers. A binary representation of biometric data of a first user may be received and reduced using an encoding process to generate a unique portion of an account number for the first user that is stored in a data store. The first user may be provided a certification mechanism that includes a chip storing the encoding process and a biometric scanning device. In response to an attempt by an unknown user to perform an interaction using the certification mechanism, a value generated by the certification mechanism may be received, and a match may be determined between the value and the unique portion of the account number stored in the data store, the match indicating the unknown user is the first user. Based on the match, the interaction may be authorized and the value is used to perform the interaction.

20 Claims, 7 Drawing Sheets

(56) References Cited

U.S. PATENT DOCUMENTS

| | | | | |
|---|---|---|---|---|
| 10,664,941 | B1* | 5/2020 | Osborn | G06F 21/34 |
| 11,423,403 | B2* | 8/2022 | Spichek | G06Q 20/4016 |
| 2003/0046237 | A1* | 3/2003 | Uberti | G06Q 20/4014 |
| | | | | 705/44 |
| 2003/0046555 | A1* | 3/2003 | Bradley | G06Q 20/40145 |
| | | | | 713/186 |
| 2007/0073619 | A1* | 3/2007 | Smith | G07C 9/257 |
| | | | | 705/41 |
| 2007/0083444 | A1 | 4/2007 | Matthews et al. | |
| 2008/0005578 | A1 | 1/2008 | Shafir | |
| 2012/0030743 | A1* | 2/2012 | Semba | G06F 21/33 |
| | | | | 726/7 |
| 2014/0337948 | A1 | 11/2014 | Hoyos | |
| 2015/0310425 | A1 | 10/2015 | Cacioppo | |
| 2017/0061438 | A1* | 3/2017 | Patel | G06Q 20/326 |
| 2017/0085562 | A1 | 3/2017 | Schultz et al. | |
| 2018/0211022 | A1* | 7/2018 | Wagner | G06Q 20/40145 |
| 2019/0327092 | A1* | 10/2019 | Kareti | G06F 18/22 |
| 2019/0392444 | A1* | 12/2019 | Butler | G06Q 20/387 |
| 2021/0158360 | A1 | 5/2021 | Somani et al. | |
| 2022/0036356 | A1 | 2/2022 | Praszczalek et al. | |
| 2022/0147605 | A1* | 5/2022 | Tussy | G06F 21/32 |
| 2022/0398556 | A1* | 12/2022 | Grassadonia | G06Q 20/385 |

OTHER PUBLICATIONS

Alsolami et al., "BioPay: Your Fingerprint is Your Credit Card," International Journal of Advanced Computer Science and Applications (IJACSA), vol. 10, No. 1, 2019, pp. 521-525.

Singh et al., "BioPay: A Secure Payment Gateway through Biometrics," Journal of Cybersecurity and Information Management (JCIM), vol. 7, No. 2, pp. 65-76, 2021.

Hartung et al., "Towards a Biometric Random Number Generator—A General Approach for True Random Extraction From Biometric Samples," IEEE BIOSIG'11: In Proc. of the IEEE Special Interest Group on Biometrics and Electronic Signatures, 2011, pp. 267-274.

Visa, "Fingerprint authentication moves from phones to payment cards," retrieved from https://usa.visa.com/visa-everywhere/security/biometric-payment-card.html on Jan. 12, 2023.

Mastercard, "Mastercard Biometric Card: Driving cardholder security and convenience," retrieved from https://www.mastercard.us/en-us/business/overview/safety-and-security/authentication-services/biometrics/biometrics-card.html on on Jan. 12, 2023.

Gerguri, Shkodran, "Biometrics Used for Random Number Generation," Masaryk University Faculty of Informatics, Brno, Spring 2008.

* cited by examiner

SYSTEMS AND METHODS FOR GENERATION AND USE OF BIOMETRIC-BASED ACCOUNT NUMBERS

TECHNICAL FIELD

Various embodiments of this disclosure relate generally to techniques for generation and use of random numbers to perform interactions, and, more particularly, to systems and methods for biometric-based generation and use of account numbers to perform interactions.

BACKGROUND

Account numbers, such as credit card and/or debit card numbers, are often 16 digits in length. The first portion of the account number (e.g., the first 6 digits) may be a bank identification number (BIN). The BIN indicates an issuer of the account, such as a financial institution, and whether the account number is a credit card number or a debit card number, for example. When the card number is presented at a terminal to perform an interaction, the terminal may utilize the BIN to route an authorization request to the appropriate issuer of the account. The remaining portion of the account number (e.g., the remaining 10 digits) may be a unique value assigned to the account holder by the account issuer. Although the value may be unique to the account holder, often the account issuer utilizes a predefined sequence, scheme, or formula to generate these values that is vulnerable to brute force attacks.

Additionally, while it is becoming more common for account issuers to utilize biometric data of account users as a second layer of authentication to authorize interactions, the corresponding biometric data is merely associated with the conventionally generated account number (e.g., the account number generated utilizing the predefined sequence, scheme, or formula) and referenced when an interaction using the conventionally generated account number is attempted.

This disclosure is directed to addressing the above-referenced challenges, among other challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for biometric-based generation and use of account numbers. The methods and systems may enable biometric data of a user to be utilized to generate a unique portion of an account number for the user, and thus perform interactions.

According to one aspect, computer-implemented methods for generating and using a biometric-based account number may be disclosed. An exemplary method may include receiving a binary representation of biometric data of a first user captured by a first biometric scanning device, reducing the binary representation of the biometric data of the first user using an encoding process to generate a unique portion of an account number for the first user, and storing the unique portion of the account number for the first user in a data store. The first user may be provided a certification mechanism that includes a chip storing the encoding process and a second biometric scanning device. The method may also include receiving, from the certification mechanism in response to an attempt by an unknown user to perform an interaction using the certification mechanism, a value generated by the certification mechanism. The value may be generated by reducing a binary representation of biometric data of the unknown user captured by the second biometric scanning device using the encoding process executed by the chip. The method may further include determining a match between the value and the unique portion of the account number for the first user stored in the data store, the match indicating the unknown user is the first user, and authorizing the interaction based on the match such that the value is used to perform the interaction.

According to another aspect, systems for generating and using a biometric-based account number may be disclosed. An exemplary system may include a certification mechanism provided to a first user that includes a chip storing an encoding process and a first biometric scanning device. The system may also include a computing device comprising at least one memory storing instructions, the instructions including the encoding process, and at least one processor operatively connected to the at least one memory and configured to execute the instructions to perform operations. The operations may include receiving, from a second biometric scanning device, a binary representation of biometric data of the first user captured by the second biometric scanning device, reducing the binary representation of the biometric data of the first user using the encoding process to generate a unique portion of an account number for the first user; and storing the unique portion of the account number for the first user in a data store. The operations may also include receiving, from the certification mechanism in response to an attempt by an unknown user to perform an interaction using the certification mechanism, a value generated by the certification mechanism. The value may be generated by reducing a binary representation of biometric data of the unknown user captured by the first biometric scanning device using the encoding process executed by the chip. The operations may further include determining a match between the value and the unique portion of the account number for the first user stored in the data store, the match indicating the unknown user is the first user, and authorizing the interaction based on the match such that the value is used to perform the interaction.

According to a further aspect, computer-implemented methods for generating and using biometric-based account numbers may be disclosed. An exemplary method may include generating a plurality of account numbers for a plurality of users. For each of the plurality of users, the generating may include receiving a binary representation of biometric data of the respective user captured by a first biometric scanning device associated with a first computing device, reducing the binary representation of the biometric data of the respective user using an encoding process to generate a unique portion of an account number for the respective user, and storing the unique portion of the account number for the respective user in a data store such that the data store includes unique portions of the plurality of account numbers for the plurality of users. The method may also include receiving a value generated by a second computing device in response to an unknown user attempting to perform an interaction using the second computing device. The value may be generated by reducing a binary representation of biometric data of the unknown user captured by a second biometric scanning device of the second computing device using the encoding process stored in a memory of and executed by a processor of the second computing device. The method may further include determining whether the value matches one of the unique portions of the plurality of account numbers for the plurality of users stored in the data store. When a match is determined, the interaction may be authorized such that the value is used to perform the interaction. When a match is not determined, the interaction may be declined.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
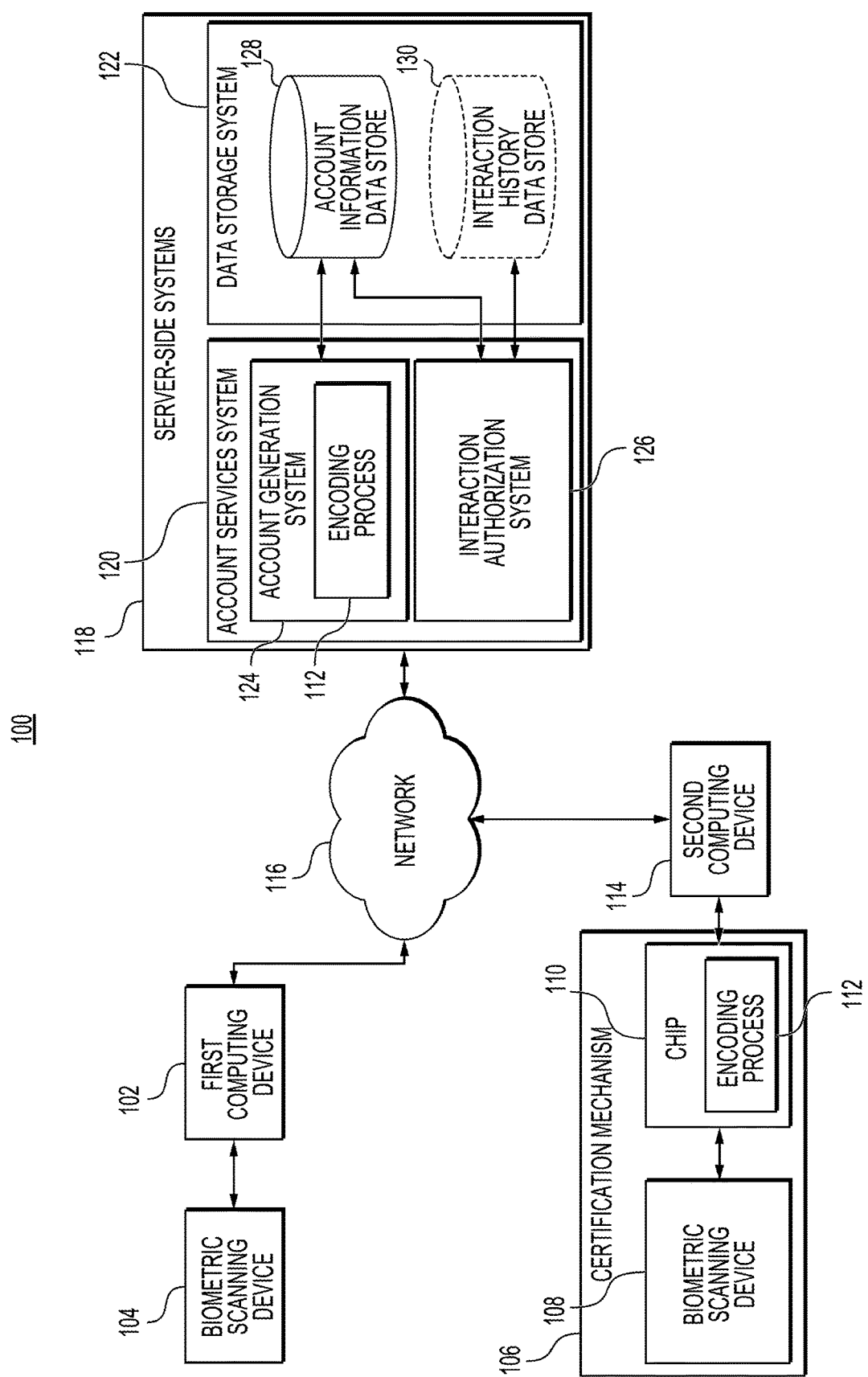
FIG. 1 depicts an exemplary environment for generation and use of biometric-based account numbers, according to certain embodiments.

According to certain aspects of the disclosure, methods and systems are disclosed for generation and use of biometric-based account numbers to perform interactions. As will be discussed in more detail below, in various embodiments, systems and methods are described for generating a unique portion of an account number for a user based on the user's biometric data such that interactions with the account number may be performed by providing the user's biometric data via a certification mechanism, for example.

Reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Similarly, the term "or" is intended to mean "and/or," unless explicitly stated otherwise. Relative terms, such as, "substantially" and "generally," are used to indicate a possible variation of ±10% of a stated or understood value.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. Specifically, an "account services provider" may be an entity or person involved in providing account services to a plurality of users (e.g., account holders), the account services including generation of biometric-based account numbers for accounts. In some examples, the account services may be associated with financial accounts and the account services provider may be associated with a financial institution. A "biometric-based account number" may encompass any type of account number for a user having a portion thereof (e.g., a unique portion of the account number) that is generated based on the user's biometrics. As used herein, terms like "account holder", "account user", or "user" generally encompass any person or entity that may have an account and consume account services from the account services provider. In some examples, the account services may be consumed via an application. The term "application" may be used interchangeably with other terms like "program," or the like, and generally encompasses software that is configured to interact with, modify, override, supplement, or operate in conjunction with other software.

A "biometric scanning device" as used herein generally encompasses any device capable of capturing and/or processing biometric data of a user. "Biometric data" may include any unique physical characteristic or information determining unique physical characteristics of a user, such as the user's fingerprint(s), face, voice, iris, palm, finger geometry (e.g., a size or position of fingers), vein(s), deoxyribonucleic acid (DNA), etc., that may be used for identifying or recognizing the user from other users. The term "certification mechanism" as used herein generally encompasses any computing device that includes an integrated biometric scanning device and one or more processing devices (e.g., a processor, microprocessor, chip, integrated circuit (IC), etc.) capable of storing and executing one or more processes. A "terminal" as used herein generally encompasses any computing device that is configured to facilitate an interaction between a user and a merchant, and is capable of communicating with a certification mechanism. An "interaction" may include a payment transaction (e.g., involving the transfer of money) or a nonpayment transaction of goods or services between the user and the merchant.

Conventionally, when creating an account, a user provides personal information, such as a name, contact information, birth date, a government identifier, etc. that may be associated with the account. An account number may then be generated for the account using a predefined sequence, scheme, or formula applied by the account issuer that may be vulnerable to brute force attack. In some examples, the user may also provide biometric data as part of the personal information for use as another layer of authentication when performing interactions using the account number. However, the biometric data is separate from and is merely associated with the account number. For example, the user may perform an interaction using the conventionally generated account number (e.g., generated using the predefined sequence, scheme, or formula), and the user's biometric data stored in association with the account number may be referenced to determine if the stored biometric data matches biometric data that is provided for authentication purposes. The present disclosure may solve one or more of the problems set forth above and/or other problems, as well as generally improve upon the conventional systems and methods for generating account numbers.

In an exemplary use case, certain embodiments may enable generation and use of a biometric-based number such that, to perform an interaction using the account number, the user provides their biometric data. In other words, the user's biometric data is a portion of the account number specific or unique to the user's account. For example, to generate the biometric-based account number, a binary representation of the user's biometric data captured and generated by a first biometric scanning device may be reduced using an encoding process to generate the unique portion of the account number. By using biometric data, the unique portion of the account number may be a truly random number (e.g., a number that is not based on a predefined sequence, scheme, or formula like conventional account numbers), and thus the biometric-based number may not be vulnerable to brute force attacks.

Additionally, the biometric-based account number may provide greater anonymity to users. For example, rather than having to gather the personal information from the user to differentiate one user from another in order to associate the account and account number with an appropriate user, the biometric data itself differentiates one user from the other, eliminating the need for the personal information.

To perform interactions using the biometric-based account number, the user may be provided a certification mechanism that includes a chip storing the same encoding process that was used to generate the unique portion of the account number and a second biometric scanning device. Accordingly, when the user utilizes the certification mechanism to perform an interaction at a terminal, for example, the binary representation of the user's biometric data may be captured and generated by the second biometric scanning device. The binary representation may be provided as input to the encoding process stored on and executed by the chip to generate a value. This value will correspond to or match the unique portion of the account number when the true user of the account is utilizing the certification mechanism. However, if someone other than the true user of the account (e.g., a fraudulent or unauthorized user) attempts to use the certification mechanism to perform an interaction, the differences in the fraudulent or unauthorized user's biometric data from the true user's biometric data will cause the value to no longer correspond to or match the unique portion of the account number.

Therefore, the value may be utilized as part of an authorization process to determine whether or not to approve or decline the interaction. For example, the value may be provided to an interaction authorization system of the account issuer via the terminal (e.g., the value may be included as part of an authorization request). The value may be used to query a data store associated with the account issuer that is configured to store at least unique portions of a plurality of account numbers for a plurality of users having been generated by the account issuer. If based on the query, the value matches once of the unique portions of the plurality of account numbers, the interaction may be approved. Otherwise, the interaction may be declined. For example, an authorization message responsive to the authorization request that indicates the approval or decline may be transmitted from the authorization system to the terminal. When approved, the value itself (e.g., the unique portion of the account number) may be used to complete the interaction.

While the specific examples included throughout the present disclosure involve financial account numbers such as credit and/or debit card numbers, it should be understood that techniques according to this disclosure may be adapted to other types of account or identification numbers for which at least a portion of the number is to be uniquely assigned to a user associated with the number, including virtual card numbers. Additionally, while the certification mechanisms disclosed in the examples herein are physical objects issued to account users, such as smart cards, the certification mechanisms may alternatively be integrated into terminals. Such integration into the terminal may allow the user to perform interactions using solely their biometric data (e.g., without the need for any physical object to present). It should also be understood that the examples above are illustrative only. The techniques and technologies of this disclosure may be adapted to any suitable activity.

FIG. 1 depicts an exemplary environment 100 for generation and use of biometric-based account numbers, according to certain embodiments, and which may be used with the techniques presented herein. A first computing device 102 and a second computing device 114, may communicate with one or more of the other components of the environment 100 across electronic network 116, including one or more server-side systems 118 associated with a provider (e.g., an account services provider).

The server-side systems 118 may include an account services system 120 and/or a data storage system 122, among other systems. The account services system 120 may include one or more sub-systems or components, such as an account generation system 124 and an interaction authorization system 126. In some examples, the account generation system 124 and interaction authorization system 126 may form a larger sub-system, such as a biometric-based account services sub-system of the account services system 120.

In some embodiments, the account services system 120 and the data storage system 122 may be associated with a common entity, e.g., the account services provider, or the like. In such embodiments, the account services system 120 and/or data storage system 122 may be part of a cloud service computer system (e.g., in a data center). In other embodiments, one or more of the components of the environment 100 may be associated with a different entity than another. For example, one or more of the sub-systems of the account services system 120 (e.g., the account generation system 124 and/or interaction authorization system 126) may be associated with a third party that provides account generation and/or interaction authorization services to the account services provider. As another example, the data storage system 122 may be associated with a third party that provides data storage services to the account services provider. The systems and devices of the environment 100 may communicate in any arrangement. As will be discussed herein, systems and/or devices of the environment 100 may communicate in order enable generation and use of biometric-based account numbers, among other activities.

The first computing device 102 may be configured to enable a user to access and/or interact with other systems in the environment 100 to request to open an account with the account services provider and/or generate a biometric-based account number for the account. For example, the first computing device 102 may be a computer system such as, for example, a desktop computer, a laptop computer, a tablet, a smart cellular phone, a smart watch or other electronic wearable, etc. In some examples, the first computing device 102 may be a device of the user requesting to open the account. In other examples, the first computing device 102 may be associated with the account services provider. For example, the first computing device 102 may be a kiosk, a teller computing device, or other similar computing device associated with the provider at a physical location of the provider.

The first computing device 102 may be associated with a biometric scanning device 104. In some examples, the biometric scanning device 104 may be a separate device that is communicatively connected wired or wireless to the first computing device 102. In other examples, the biometric scanning device 104 may be integrated with (e.g., is a component of) the first computing device 102. The biometric scanning device 104 may be configured to capture biometric data of the user requesting to open the account and generate a binary representation of the biometric data. The types of biometric data received may include data obtained from the user's fingerprint(s), face, voice, iris, palm, finger geometry (e.g., a size or position of fingers), vein(s), DNA, and/or the like. In some examples, more than one type of biometric data may be captured for the user. In one non-limiting example, the biometric scanning device 104 may include an optical sensor with a charge-coupled device (CCD) camera configured to capture an image of the user's fingerprint, and an image processing system configured to generate a binary representation of the fingerprint from the image.

The first computing device 102 may communicate with one or more of the server-side systems 118 over the network 116 to prompt generation of a biometric-based account number for the user. For example, the first computing device 102 may provide the binary representation of the biometric data generated by the biometric scanning device 104 to the account generation system 124 for use in generating the biometric-based account number for the user, as described in detail below. At least a portion of the biometric-based account number is a unique portion generated based on the user's biometric data.

In some embodiments, the first computing device 102 may include one or more electronic application(s), e.g., a program, plugin, browser extension, etc., installed on a memory of the first computing device 102. In some embodiments, the electronic application(s) may be associated with one or more of the other components in the environment 100, such as an application that is configured to communicate with one or more of the server-side systems 118. For example, the application may be executed on the first computing device 102 to enable the user to request to open the account and generate the biometric-based account number for the account utilizing services provided by the account services system 120. In some examples, the application may be a thick client application that is installed locally on the first computing device 102 (e.g., a desktop application or mobile application). In other examples, the application may be a thin client application (e.g., a web application) that is rendered via a web browser launched on the first computing device 102.

Additionally, one or more components of the first computing device 102 102 may generate, or may cause to be generated, one or more graphic user interfaces (GUIs) based on instructions/information stored in the memory, instructions/information received from the other systems in the environment 100, and/or the like and may cause the GUIs to be displayed via a display of the first computing device 102. The GUIs may be, e.g., mobile application interfaces or browser user interfaces and may include text, input text boxes, selection controls, and/or the like. The display may include a touch screen or a display with other input systems (e.g., a mouse, keyboard, etc.) for the user of the first computing device 102 to control the functions of the first computing device 102.

Once the biometric-based account number has been generated (e.g., the account has been established), the account services provider may issue a certification mechanism 106 to the user. In some examples, the certification mechanism 106 may be a physical object, such as a card, token, or other similar object, that includes a biometric scanning device 108 and a chip 110. In other examples, the certification mechanism 106 may be integrated into a terminal, such as the second computing device 114.

The biometric scanning device 108 may be integrated with (e.g., is a component of) the certification mechanism 106 and may be configured to capture at least one of the same types of biometric data as the biometric scanning device 104 associated with the first computing device and generate a binary representation of the biometric data. As one non-limiting example, the biometric scanning device 108 may include an optical sensor with a charge-coupled device (CCD) camera configured to capture an image of the user's fingerprint, and an image processing system configured to generate a binary representation of the fingerprint from the image. In further examples, the certification mechanism 106 may include one or more additional sensors used in conjunction with the biometric scanning device 108, such as temperature sensors and/or pulse detection sensors (e.g., piezoelectric pulse sensors, semiconductor pressure sensors, and/or fiber optic pulse sensors)

The chip 110 may be an IC embedded in the certification mechanism 106. The user's biometric data and/or at least the unique portion of the account number generated based on the user's biometric data is not stored in the IC. Instead, an algorithm for an encoding process 112 (also referred to herein as a first encoding process) may be stored in the chip 110. In some examples, no indication of the account number may be provided on an exterior of the certification mechanism 106 either. Additionally, the chip 110 may store other account-related values, such as an initial portion of the account number (a non-unique portion of the account number) that indicates where to route authorization requests when interactions are performed using the certification mechanism 106, a card security value (CSV), and/or other similar value. In one non-limiting example, the certification mechanism 106 may be a smart card, where the biometric scanning device 108 integrated therein is the above-described optical sensor for capturing fingerprints, and the chip 110 is a Euorpay, Mastercard, and Visa (EMV) chip having the algorithm for the encoding process 112 stored therein.

The second computing device 114 may be a terminal associated with a merchant. The user may present the certification mechanism 106 at the second computing device 114 to perform an interaction, such as to complete a transaction between the user and the merchant. The second computing device 114 may receive a value generated by the certification mechanism 106 to provide (e.g., as part of an authorization request) to one or more of the server-side systems 118 over the network 116, such as the interaction authorization system 126 of the account services system 120. The value may be an output of the encoding process 112 that is based on the binary representation of the biometric data captured and generated by the biometric scanning device 108 as the user presents the certification mechanism 106 at the second computing device 114. In some examples, and as described in detail elsewhere herein, the value may be augmented with interaction-based identifiers, and the augmented value may be received by the second computing device 114. If the user presenting the certification mechanism 106 is indeed the account user (and not a fraudulent or unauthorized user), the value will match with the biometric-based account number generated for the user and the interaction may be authorized and performed using that value, as described in greater detail elsewhere herein.

The account services system 120 may include one or more server devices (or other similar computing devices) for executing various account services of the account services provider. As one example account service, utilizing the first computing device 102, the account services system 120 may enable the user to, among other account-related tasks, open the account with the account services provider. Opening of the account may include generation of an account number for the account using the account generation system 124. The account number may be a biometric-based account number generated using the algorithm for the encoding process 112 (e.g., the same algorithm for the encoding process 112 that is stored on the chip 110 of the certification mechanism 106 subsequently issued to the user). As one non-limiting example, the biometric scanning device 104 may capture biometric data of the user and generate a binary representation of the biometric data that is provided to the account generation system 124 via the first computing device 102. The encoding process 112 executed by the account generation system 124 may reduce the binary representation of the biometric data to generate a unique portion of an account number for the user that is stored in the data storage system 122.

An initial portion of the account number may be a BIN that identifies at least the issuer of the account (e.g., the account services provider) and the type of the account (e.g., credit card account, debit card account, etc.). That is, an entirety of the biometric-based account number may include the BIN as the initial portion and the unique portion of the account number as the remaining portion. In a non-limiting example, the BIN may include an initial 6 digits and the unique portion may include the remaining 10 digits of a 16 digit account number. In some examples, and as described elsewhere herein, the BIN may also indicate that the account number is a biometric-based card number. That is, a conventional credit card number issued by account services provider and a biometric-based credit card number issued by the same account services provider may have distinct BINs despite being of a same type of account from the same provider.

As another example account service, the interaction authorization system 126 of the account services system 120 may approve and/or decline an interaction attempted to be performed using the certification mechanism 106 issued to the user. For example, the interaction authorization system 126 may receive an authorization request over the network 116 from the second computing device 114 when the certification mechanism is presented at the second computing device 114 to perform the interaction. The authorization request may include the value generated by the certification mechanism 106 (e.g., the value generated using the encoding process 112 stored on the chip 110 based on the biometric data of a user attempting the interaction that is captured by the biometric scanning device 108). The value may be referenced against a plurality of biometric-based account numbers stored in the data storage system 122, as described below. In some examples, if the augmented value is included in the authorization request (e.g., the value augmented with interaction-based identifiers), one or more additional processes may be performed to extract the value prior to referencing the biometric-based account numbers stored in the data storage system 122.

If the user attempting the interaction is indeed the account user (and not a fraudulent or unauthorized user), the value will match one of the plurality of biometric-based account numbers (e.g., the particular biometric-based account number generated for the account user), and the interaction may be authorized and performed using that value. Otherwise, if the user attempting the interaction is not the account user, the value will not match because the biometric data of the attempting user and account user are distinct, and the interaction will be declined. The interaction authorization system 126 may provide the approval and/or decline of the interaction as part of an authorization message to the second computing device 114.

The data storage system 122 may include a server system or computer-readable memory such as a hard drive, flash drive, disk, etc. In some embodiments, the data storage system 122 includes and/or interacts with an application programming interface for exchanging data to other systems, e.g., one or more of the other components of the environment, such as at least the account generation system 124 and/or interaction authorization system 126 of the account services system 120. In some examples, the data storage system 122 may be a sub-system or component of the account services system 120 (e.g., when the data storage system 122 is also provided by the account services provider rather than a third party). The data storage system 122 may include and/or act as a repository or source for various types of account-related data. For example, the data storage system 122 may include a plurality of data stores, including an account information data store 128 and/or an optional interaction history data store 130, among other data stores.

The account information data store 128 may include account information associated with a plurality of accounts for a plurality of users issued by the account services provider. The account information for a given account may be stored in association with an identifier for the given account, such as a user identifier of the account user or other similar identifier. In some examples, the user may have more than one account with the account services provider. For example, the user may have one or more credit card accounts, debit card accounts, savings accounts, checking accounts, investment accounts, etc. Information for each of these accounts may be associated with the user's identifier.

When the account generation system 124 generates a new account number for the user, such as the above-described biometric-based account number, at least the unique portion of the biometric-based account number may be provided to the account information data store 128 for storage in association with the account user. Accordingly, the account information data store 128 may store unique portions of a plurality of biometric-based account numbers for a plurality users. In some examples, the unique portions of the account numbers may be tokenized prior to storage such that the account information data store 128 stores tokens representing the unique portions. When the interaction authorization system 126 receives an authorization request from a terminal, such as the second computing device 114, the value included in the request (or a token representing the value) may be used to query the account information data store 128 to determine whether there is a matching biometric-based account number stored therein.

The interaction history data store 130 may include data associated with historical interactions. For each historical interaction, the data may include values (and particularly augmented values) that were received by the interaction authorization system 126 as part of the authorization request from terminals, such as the second computing device 114. As described in detail elsewhere herein, the augmented values stored in the interaction history data store 130 may be referenced as part of the authorization process to determine whether a current augmented value included in an authorization request is a duplicate of any of the augmented values stored in the interaction history data store 130, and thus indicative of fraud.

In some examples, the biometric-based account numbers may be stored in a separate data store from other account numbers issued by the provider. In such examples, the BIN number provided as the initial portion of the biometric-based account number may indicate that this is a biometric-based account number (e.g., in addition to indicating the issuer and type of account) to facilitate routing of the authorization request to the interaction authorization system 126 to trigger the querying of the separate data store.

The network 116 over which the one or more components of the environment 100 communicate may include one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 116 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like. The first computing device 102, the second computing device 114, and one or more of the server-side systems 118 may be connected via the network 116, using one or more standard communication protocols. The first computing device 102, the second computing device 114, and the one or more of the server-side systems 118 may transmit and receive communications from each other across the network 116, as discussed in more detail below.

Although depicted as separate components in FIG. 1, it should be understood that a component or portion of a component in the system of exemplary environment 100 may, in some embodiments, be integrated with or incorporated into one or more other components. For example, the biometric scanning device 104 may be integrated with the first computing device 102, the certification mechanism 106 may be integrated with the second computing device 114, the interaction authorization system 126 may be integrated with the account generation system 124, the data storage system 122 may be integrated with the account services system 120, and/or the like. In some embodiments, operations or aspects of one or more of the components discussed above may be distributed amongst one or more other components. Any suitable arrangement and/or integration of the various systems and devices of the exemplary environment 100 may be used.

In the following disclosure, various acts may be described as performed or executed by a component from FIG. 1, such as the first computing device 102, the biometric scanning device 104, the certification mechanism 106, the second computing device 114, one or more of the server-side systems 118, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
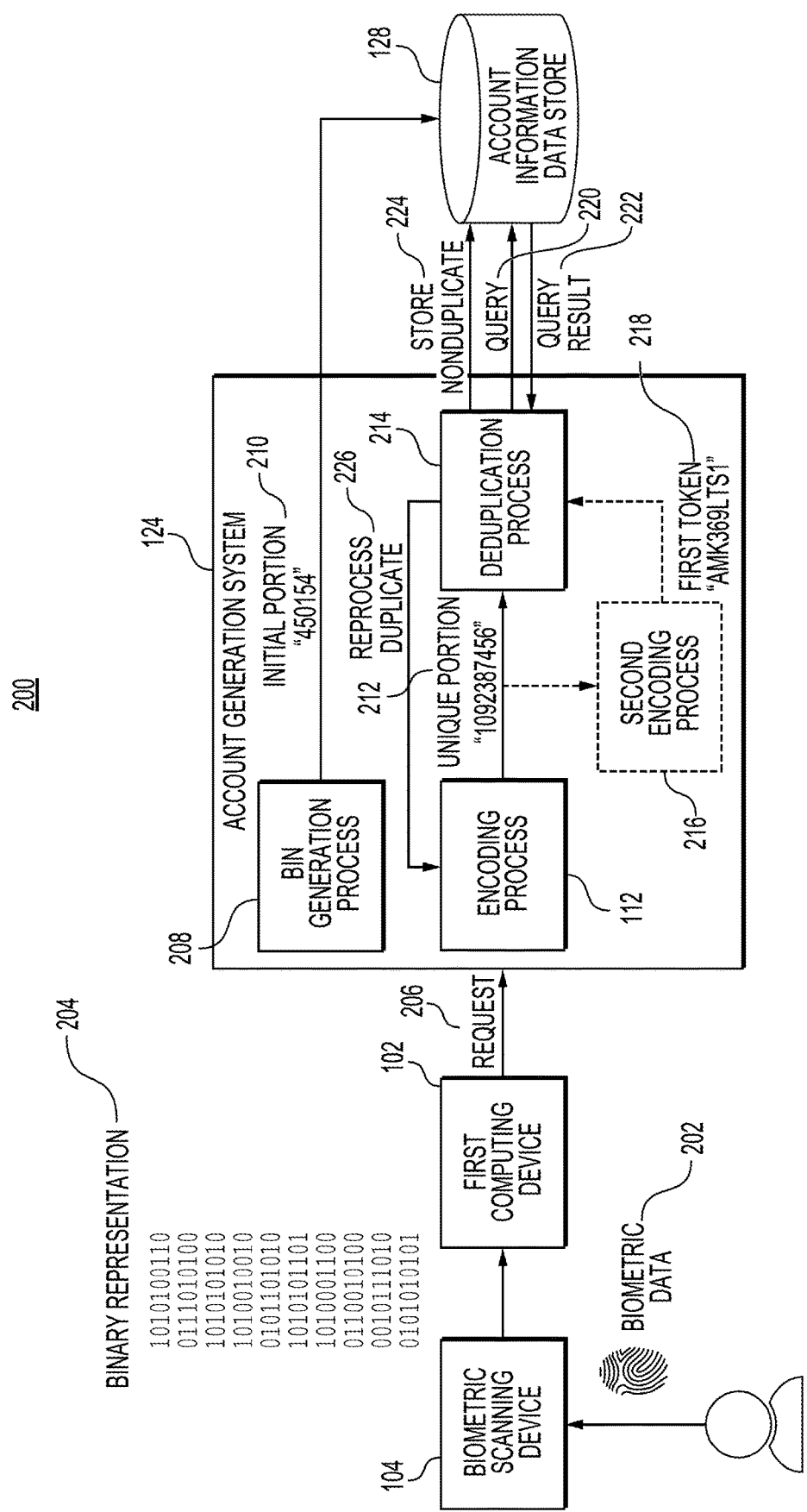
FIG. 2 is a system flow diagram depicting an exemplary process for generating a biometric-based account number, according to certain embodiments.

FIG. 2 depicts a system flow diagram 200 depicting an exemplary process for generating a biometric-based account number. In some examples the process may be performed by one or components of the environment 100 described with reference to FIG. 1. For example, a user may initiate a request to open an account through an application associated with the account services provider that is executing on the first computing device 102. As part of the process to open the account, the user may be prompted by the application to provide one type or a combination of different types of biometric data 202 via the biometric scanning device 104 associated with the first computing device 102. In some examples, the biometric scanning device 104 may include an optical sensor with a charge-coupled device (CCD) camera configured to capture an image of the user's fingerprint. In other examples, different types of biometric scanning devices may be used to collect alternative types of biometric data.

The biometric scanning device 104 may be configured to generate a binary representation 204 of the biometric data 202. For example, continuing with the fingerprint example, the biometric scanning device 104 may also include an image processing system configured to generate the binary representation 204 of the fingerprint from the image. To generate the binary representation 204, features of the fingerprint, such as points in whorls and/or valleys, may be extracted from the image, and one or more templates may be applied to generate numerical data representing the features (e.g., in a binary format). The binary representation 204 may be routed to the account generation system 124 via the first computing device 102. For example, the binary representation 204 may be provided as part of an account number generation request (e.g., request 206) transmitted to the account generation system 124 via the application executing on the first computing device 102. In some examples, the user may be prompted by the application to input other identifying information to be associated with the account (e.g., the user's name, contact information, date of birth, a government-issued identification number, etc.), which may be included as part of the request 206 along with the binary representation 204. In other examples, the binary representation 204 alone may be sufficient to generate the biometric-based account number to preserve anonymity of the user.

Upon receipt of the request 206, the account generation system 124 may be configured to perform one or more processes, such as a BIN generation process 208 and the encoding process 112. In some examples, the BIN generation process 208 and the encoding process 112 may be performed concurrently. In other examples, the BIN generation process 208 and the encoding process 112 may be performed sequentially.

The BIN generation process 208 may generate an initial portion 210 of an account number for the account to be opened. In some examples and as shown in FIG. 2, the initial portion 210 may be a first 6 digits of the account number (e.g., "450154"). The initial portion 210 may be generated using an algorithm or formula. The initial portion 210 may be a BIN that represents at least an account type (e.g., credit card, debit card, etc.) of the account and the issuer of the account (e.g., the account services provider). Therefore, the initial portion 210 may be common between account users having a same type of account with the account services provider. For example, a plurality of credit card accounts issued by the account services provider may have account numbers that share the initial portion 210 (e.g., the account numbers have a same first 6 digits). The initial portion 210 may be used by terminals, such as the second computing device 114, to route interaction authorization requests to the appropriate account issuer (e.g., to the interaction authorization system 126 of the account services provider) when the account number is provided for use during an interaction.

In some examples, the BIN comprising the initial portion 210 may further represent accounts having biometric-based account numbers. For example, credit cards accounts issued by the account services provider having biometric-based account numbers may have a different BIN than credit cards accounts having account numbers conventionally generated by the account services provider (e.g., utilizing a sequence, scheme, formula etc.).

The initial portion 210 may be stored in the account information data store 128 in association with the account. Because the initial portion 210 is common between multiple account numbers and is public knowledge (e.g., to enable use by terminals, etc.) to route authorization requests, the initial portion 210 may be stored in the account information data store 128 without any encryption, hashing, or tokenizing.

The encoding process 112 may receive the binary representation 204 included in the request 206 as input. The binary representation 204 may include a plurality of characters (e.g., more than 10 characters and up to hundreds or thousands of characters). The encoding process 112 may be configured to reduce the binary representation 204 to generate, as output, a unique portion 212 of the account number for the account to be opened. In some examples and as shown in FIG. 2, the binary representation 204 may be reduced to 10 characters (e.g., forming the last 10 digits of a 16 digit account number, "1092387456"). By utilizing the binary representation 204 of the biometric data 202 of the user to generate the unique portion 212, the unique portion 212 is a truly random number. Therefore, unlike account numbers generated via conventional systems and methods, the biometric-based account number is not vulnerable to brute force attacks as there is not predefined sequence or scheme being applied to create the account number.

While the biometric data 202 of the user, and thus the binary representation 204 thereof, is unique from any other account user, when the binary representation 204 is reduced, there may be a possibility that the unique portion 212 of the account number generated for the user's account may be a duplicate of one or more other unique portions of account numbers generated for other users' accounts. Accordingly, to avoid duplicates, the account generation system 124 may include deduplication logic implemented via a deduplication process 214. For example, the unique portion 212 of the account number may be input to a deduplication process 214. The deduplication process 214 may use the unique portion 212 to submit a query 220 to the account information data store 128 to determine, based on a query result 222, whether the unique portion 212 is already associated with another account.

If, based on the query results 222, the unique portion 212 is determined to be a nonduplicate, the unique portion 212 may be stored in the account information data store 128 in association with the account at step 224. Alternatively, if the unique portion 212 is determined to be a duplicate, the duplicate may be reprocessed at step 226. For example, the encoding process 112 may generate a new unique portion of the account number based on at least two randomly generated numbers (e.g., at least first and second randomly generated numbers). The first randomly generated number may be the reduced binary representation. The second randomly generated number may be a card security value (CSV) or other similar value associated with the account. In some examples, the new unique portion of the account number may be re-run through the deduplication process 214, and upon determination that the new unique portion is a nonduplicate, the new unique portion may be stored in the account information data store 128 at step 224.

In further examples, upon the generation of the unique portion 212 by the encoding process 112 (e.g., a first encoding process), the account generation system 124 may optionally perform a second encoding process 216 to tokenize the unique portion 212 of the account number. For example, the second encoding process 216 may generate a first token 218 to represent the unique portion 212. The second encoding process 216 may convert the unique portion 212 to the first token 218 using a predefined algorithm or function, for example. In some examples and as shown in FIG. 2, the first token 218 may be a combination of alphanumeric characters ("AMK369LTS1"). The conversion of the unique portion 212 to the first token 218 for storage in the account information data store 128 may enhance a level of security or protection for the account number in the event, for example, the account information data store 128 is attacked and information stored therein is retrieved by a bad actor. When tokens are stored, the bad actor may only obtain tokens, such as first token 218, rather than the account numbers themselves. The first token 218 is unable to be used to perform interactions (e.g., interactions would be declined by interaction authorization system 126). Additionally, it may be difficult for the bad actor to reverse the algorithm or function utilized by the second encoding process 216 to determine the unique portion 212 from the first token 218.

In such examples, where the unique portion 212 is tokenized via the second encoding process 216, the first token 218 may be input to the deduplication process 214. The deduplication process 214 may use the first token 218 to submit the query 220 to the account information data store 128 to determine, based on the query result 222, whether the first token 218 is already associated with another account. If the first token 218 is determined to be a nonduplicate, the first token 218 may be stored in the account information data store 128 in association with the account at step 224. Alternatively, if the first token 218 is determined to be a duplicate, the duplicate may be reprocessed at step 226. For example, the encoding process 112 may generate a new unique portion of the account number based on at least two randomly generated numbers, as described above, and the new unique portion may be tokenized via the second encoding process 216 to generate a new token. In some examples, the new token may be re-run through the deduplication process 214, and upon determination that the new token is a nonduplicate, the new token may be stored in the account information data store 128 at step 224.

The above-described examples discuss generating a new unique portion of the account number based on at least the first and second randomly generated numbers when the unique portion 212 initially generated by the encoding process 112 is determined to be duplicate. In other examples, the encoding process 112 may generate the unique portion 212 using the first and second randomly generated numbers regardless of duplication status. For example, to proactively prevent duplication, the encoding process 112 may use the reduced binary representation as the first randomly generated number, along with at least a second randomly generated number to generate the unique portion 212.

An entirety of the account number for the account may include the initial portion 210 and the unique portion 212 (e.g., "4501541092387456" based on FIG. 2 examples). Once the account is established and account number is generated, the user may be issued the certification mechanism 106, as described in detail above with reference to FIG. 1. The user's biometric data 202, the binary representation 204, and at least the unique portion 212 are not stored in the chip 110 of certification mechanism 106. Additionally, no indication of the account number may be provided on an exterior of the certification mechanism 106 either. In some examples, the user may altogether not be provided with the unique portion 212 of the account number and/or first token 218, if applicable. In other examples, the user may just be provided with the first token 218, if applicable. The user may use the certification mechanism 106 to perform interactions using the biometric-based account number, as described in detail below.

Figure 3A:
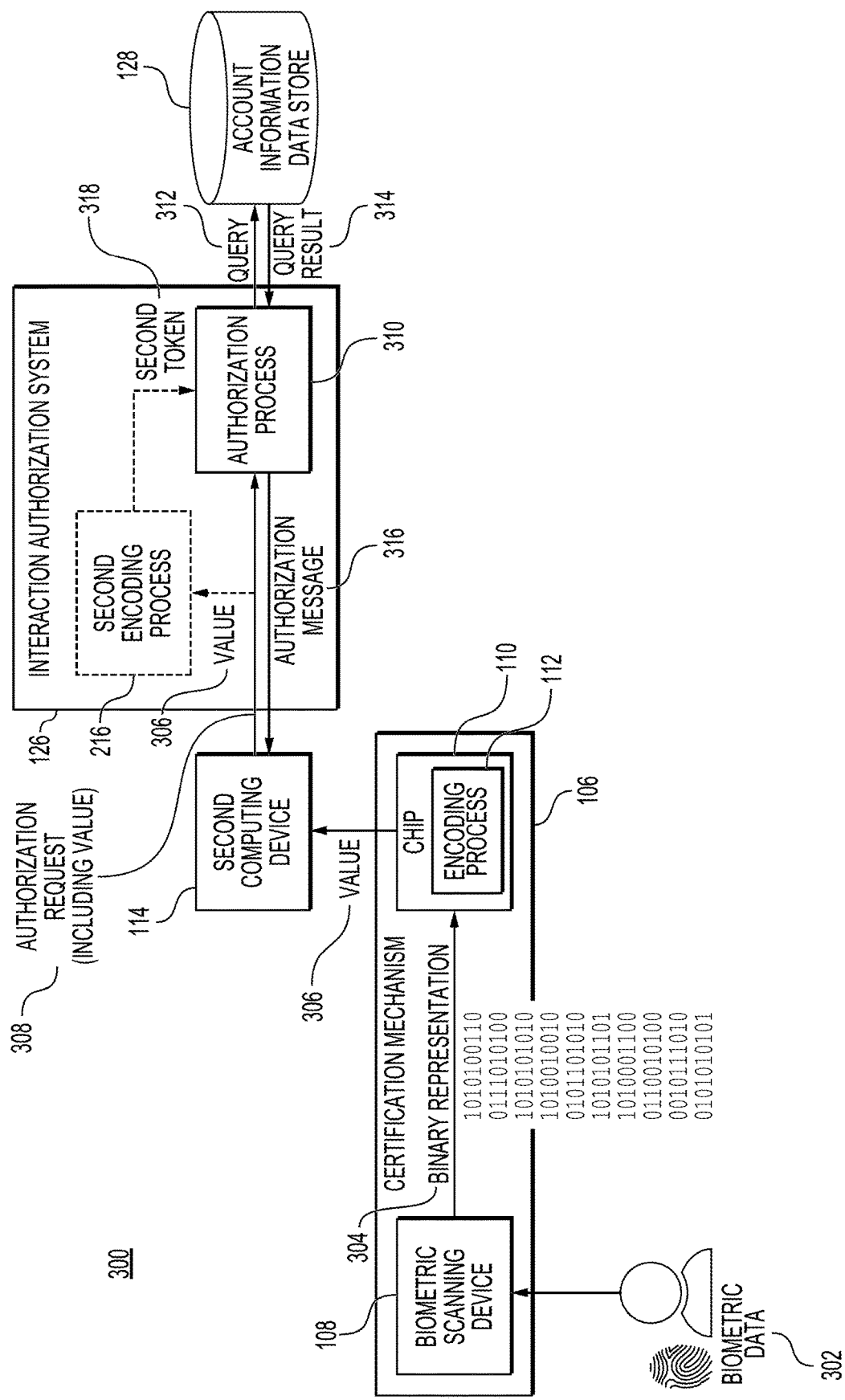
FIGS. 3A and 3B are system flow diagrams depicting exemplary processes for using a biometric-based account number to perform an interaction, according to certain embodiments.
Figure 3B:
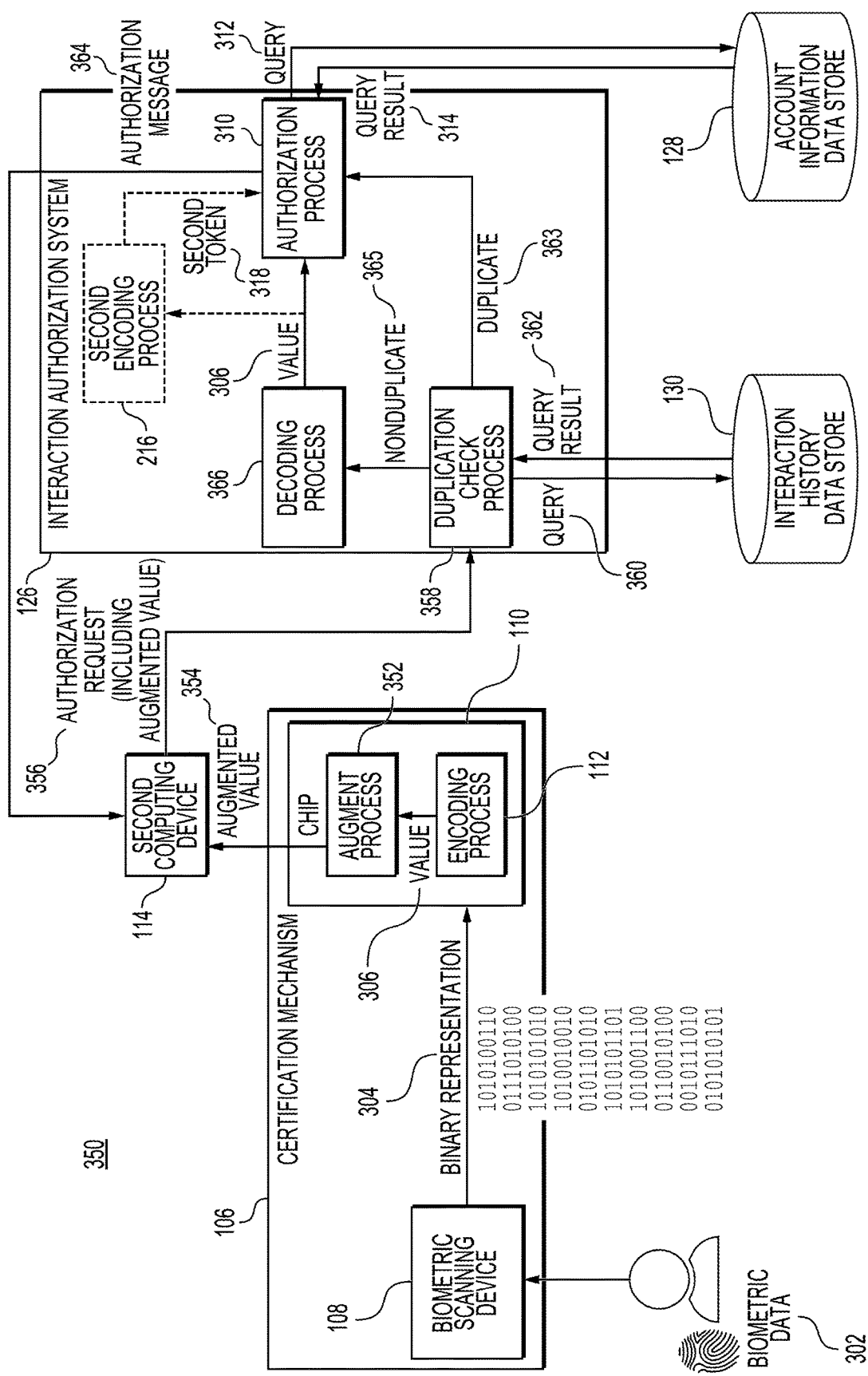

FIGS. 3A and 3B are system flow diagrams 300, 350 depicting exemplary processes for using a biometric-based account number to perform an interaction, according to certain embodiments. In some examples, the processes may be performed by one or components of the environment 100 described with reference to FIG. 1.

FIG. 3A is a system flow diagram 300 depicting a first exemplary process for using a biometric-based account number to perform an interaction. For example, an unknown user may attempt to perform an interaction using the certification mechanism 106. To provide an exemplary scenario, the unknown user having the certification mechanism 106 in their possession may enter into the proximity of and/or insert a portion of the certification mechanism 106 (e.g. a portion including the chip 110) into the second computing device 114 (e.g., a terminal). Resultantly, communication between the second computing device 114 and the certification mechanism 106 may be established, and power may be provided from the second computing device 114 to components of the certification mechanism 106 to enable processing by the certification mechanism 106.

The unknown user may interact with the certification mechanism 106 in a manner that causes the biometric scanning device 108 integrated in the certification mechanism 106 to capture biometric data 302 of the unknown user. The biometric scanning device 108 may be configured to capture at least one of the same types of biometric data as the biometric scanning device 104 utilized in the account number generation process, as described with reference to FIG. 2. In one example and as shown in FIGS. 3A and 3B, the biometric scanning device 108 may be a fingerprint scanning device (e.g., the above-described optical sensor) configured to capture images of the unknown user's fingerprints as the biometric data 302. Continuing with this example, to interact with the certification mechanism 106, the unknown user may position a thumb or finger relative to (e.g., over) the biometric scanning device 108 to enable capture of one or more images of the fingerprint. In some examples, an exterior of the certification mechanism 106 may include one or more visual indicators to facilitate the positioning of the thumb or finger relative to the biometric scanning device 108.

The biometric scanning device 108 may be configured to generate a binary representation 304 of the biometric data 302 captured. The biometric scanning device 108 may generate the binary representation 304 in a same or similar manner to the binary representation 204 generated by the biometric scanning device 104, as described in detail with reference to FIG. 2. The biometric scanning device 108 may transmit the binary representation 304 to the chip 110 for processing. For example, the binary representation 304 may be provided as input to the encoding process 112 that is stored on and executed by the chip 110 to generate a value 306 as output.

The encoding process 112 stored and executed by the chip 110 is the same encoding process 112 that is stored and executed by the account generation system 124 to generate the unique portion 212 of the account number, as described in detail with reference to FIG. 2. Therefore, the encoding process 112 executed by the chip 110 may be configured to reduce the binary representation 304 to generate the value 306 using the same algorithm or function that was used by the encoding process 112 executed by the account generation system 124 to reduce the binary representation 204 to generate the unique portion 212 of the account number for the user. Additionally, in examples, where the encoding process 112 executed by the account generation system 124 generates the unique portion 212 utilizing the reduced binary representation as the first randomly generated number and at least a second randomly generated number (e.g., a CSV associated with the account number), the encoding process 112 executed by the chip 110 may be configured to similarly generate the value 306 utilizing the reduced binary representation as the first randomly generated number and at least the second randomly generated number. The second randomly number may be stored on the chip 110 and provided to the encoding process 112 along with the binary representation 304.

Resultantly, if the unknown user in possession of the certification mechanism 106 is indeed the account user (e.g., instead of a fraudulent or unauthorized user), the biometric data 302 and the binary representation 304 thereof are the same as the biometric data 202 and binary representation 204 used to generate the unique portion 212 of the account number. Thus, the value 306 output by the encoding process 112 on the chip 110 will be the same as (e.g., will match) the unique portion 212 of the account number. Conversely, if the unknown user in possession of the certification mechanism 106 is not the user, the biometric data 302 and the binary representation 304 thereof will be different from the biometric data 202 and binary representation 204 used to generate the unique portion 212 of the account number. Thus, the value 306 output by the encoding process 112 on the chip 110 will not be equivalent to (e.g., will not match) the unique portion 212 of the account number. Therefore, the value 306 may be utilized by the interaction authorization system 126 to determine whether to approve or decline the interaction, as described in detail below.

In some examples, the certification mechanism 106 may include one or more additional sensors used in conjunction with the biometric scanning device 108, such as temperature sensors and/or pulse detection sensors (e.g., piezoelectric pulse sensors, semiconductor pressure sensors, and/or fiber optic pulse sensors). In such examples, temperature and/or pulse rate data collected by the sensors may be provided to the chip 110. The chip 110 may be configured to determine whether the temperature and/or rate of pulse meets or exceeds a predefined threshold that indicates the finger is still receiving blood flow, for example. If the predefined threshold is met, the chip 110 may proceed with providing the value 306 and/or other account-related information, as discussed below, to the second computing device 114. Otherwise, if the predefined threshold is not met, no data may be communicated to the second computing device 114, which prevents the interaction from being authorized. This prevents the interaction from moving forward in the rare scenario that a bad actor removed the user's finger from their body to apply to the biometric scanning device 108 in order to use the certification mechanism 106 to perform the interaction. While the chip 110 is described as performing the threshold determination herein, in other examples, the temperature and/or pulse rate data may be provided to the second computing device 114, and the second computing device 114 may perform the determination.

As previously discussed, the value 306 generated as output of the encoding process 112 may be provided to the second computing device 114. In addition to providing the value to the second computing device 114, the chip 110 may provide other account-related information stored by the chip 110, such as the initial portion 210 of the user's account number and/or a CSV associated with the user's account number. The second computing device 114 may be configured to generate an authorization request 308 that includes the value 306. The initial portion 210 of the user's account number may indicate an issuer of the account, among other information, and thus may be used by the second computing device 114 to route the authorization request 308 to the appropriate system associated with the issuer of the account (e.g. the interaction authorization system 126). In some examples, the authorization request 308 may also include at least a portion of the other account-related information, such as the CSV. For example, the CSV may be included if the unique portion 212 of the account number was generated based on at least the reduced binary representation (e.g., the first randomly generated number) and the CSV (e.g., the second randomly generated number).

In some examples, at least the value 306 included in the authorization request 308 may be received as input to an authorization process 310 of the interaction authorization system 126. Using the value 306, the authorization process 310 may generate and submit a query 312 to the account information data store 128 to determine whether the value 306 matches any of the unique portions of account numbers stored in the account information data store 128. If the unknown user attempting to perform the interaction is indeed the user who opened the account associated with the biometric-based account number that has the unique portion 212 of the account number described with reference to FIG. 2, the value 306 may match the unique portion 212 from the plurality of unique portions of account numbers stored in the account information data store 128. However, if the unknown user is a fraudulent or unauthorized user (e.g., does not have any accounts with the account services provider that are associated with biometric-based account numbers), no matches for the value 306 may be determined. A query result 314 may be received from the account information data store 128 that indicates whether a match was determined.

In the above-described example and as shown in FIG. 3A, the value 306 may be generated by the encoding process 112 stored on the chip 110, provided to the second computing device 114, and included within the authorization request 308 transmitted to the interaction authorization system 126. In other examples (not shown), only the binary representation 304 may be provided by the chip 110 to the second computing device 114. The second computing device 114 may include the binary representation 304 in an authorization request transmitted to the interaction authorization system 126. The binary representation 304 may be provided as input to the encoding process 112 stored and executed by the account generation system 124 for reduction to generate the value 306 (e.g., corresponding to the unique portion 212) as output. The authorization process 310 may then generate and submit the query 312 to the account information data store 128, as described in detail above, to determine whether the value 306 matches any of the unique portions of account numbers stored in the account information data store 128.

By the second computing device 114 only receiving and transmitting the binary representation 304 (e.g., as opposed to the value 306 itself), the account may be protected from fraudulent skimming. For example, even if the second computing device 114 is compromised by a skimmer device, the skimmer device may only retrieve the binary representation 304, which may be hundreds of characters long, and has no mechanism for extracting the value 306 corresponding to the unique portion 212 of the account number from the binary representation 304 (e.g., brute force attack will not be successful). Other measures may be taken to prevent fraudulent skimming when the chip 110 does execute the encoding process to generate the value 306, as described in detail with reference to FIG. 3B.

An authorization message 316 responsive to the authorization request 308 may be generated as output of the authorization process 310, where the authorization message 316 may be based on the query result 314. For example, if the query result 314 indicates the value 306 matches one of the unique portions of account numbers (e.g., the unique portion 212), then the authorization message 316 may indicate that the interaction is approved. That is, the authorization message 316 may include an approval code. Alternatively, if the query result 314 indicates the value 306 does not match any of the unique portions of account numbers (e.g., indicative of fraud or unauthorized use), then the authorization message 316 may indicate that the interaction is denied. That is, the authorization message 316 may include a decline code.

In other examples, the interaction authorization system 126 may be configured to optionally perform the second encoding process 216 prior to performing the authorization process 310. For example, the optional second encoding process 216 may be performed by the interaction authorization system 126 if the account generation system 124 applied the optional second encoding process 216 to generate the first token 218 for storage in the account information data store 128. In other words, the optional second encoding process 216 may be performed when tokens representative of the values, rather than the values themselves, are being stored in the account information data store 128. In such examples, the value 306 included in the received authorization request 308 may first be received as input to the second encoding process 216 to generate a second token 318 as output. The second token 318 may then be received as input to the authorization process 310, and used to query the account information data store 128 to determine whether or not the second token 318 matches any other token stored in the account information data store 128, such as the first token 218. The authorization message 316 may be generated based on the token-based match determination in a similar manner as described above for the value-based match determination.

FIG. 3B is a system flow diagram 350 depicting a secondary exemplary process for using a biometric-based account number to perform an interaction. The secondary exemplary process may be similar to the first exemplary process described with reference to FIG. 3A, except that the chip 110 may be further configured to augment the value 306 output by the encoding process 112, causing one or more additional processes to be performed by the interaction authorization system 126.

For example, the value 306 may be provided as input to an augment process 352 to generate an augmented value 354 as output. The value 306 may be augmented using one or a combination of interaction-based identifiers to generate the augmented value 354. One exemplary interaction-based identifier may include an identifier of a terminal associated with the interaction (e.g., an identifier of the second computing device 114). Another exemplary interaction-based identifier may include a time stamp associated with the interaction. In some examples, the interaction-based identifiers may be received by the chip 110 as part of the communication established between the second computing device 114 and the certification mechanism 106. In one example, characters (e.g., number and/or letters) of the interaction-based identifiers may be combined with the value 306 to generate the augmented value 354 according to a predefined sequence or scheme in a manner that does not disrupt or segment the value 306 (e.g., the characters may be added before or after the value 306 such that the value 306 remains intact). In another example, a function may be used to combine the characters of the interaction-based identifiers with the value 306 to generate the augmented value 354.

Generation of the augmented value 354 ensures that each interaction performed by the user utilizing the certification mechanism 106 has a unique data value that is provided from the chip 110 to a terminal, such as the second computing device 114. Having interaction-specific data values may provide countermeasures against potential skimming attacks. For example, if the value 306 in the unaugmented form is provided to a terminal, as described in the first exemplary process in FIG. 3A, and the terminal has been compromised by a skimmer device, the skimmer device may be able to retrieve the value 306. If the user having presented the certification mechanism 106 is indeed the user, the value 306 corresponds to the unique portion 212 of the account number, as described above, and thus the skimmer device has retrieved the unique portion 212 of the account number. Because the initial portion 210 of the account number may be public knowledge and/or may be read by the skimmer device as well, the entirety of account number may now be identified and used for fraudulent purposes.

In contrast, by the chip 110 instead generating and providing the augmented value 354 to a terminal, such as the second computing device 114, only the augmented value 354 may be retrieved by a skimmer device if the terminal is compromised. Because the augmented value 354 is generated to be unique or specific to a single interaction, if a fraudster utilizes the augmented value 354 retrieved by the skimmer device to attempt to perform another interaction, the augmented value 354 may be flagged by the interaction authorization system 126 as a duplicate (e.g., indicating it was obtained fraudulently), and the interaction may be declined, as described in more detail below.

The augmented value 354 generated as output of the augment process 352 may be provided to the second computing device 114. In addition to providing the augmented value 354 to the second computing device 114, the chip 110 may provide other account-related information stored by the chip 110, such as the initial portion 210 of the user's account number and/or a CSV associated with the user's account number. The second computing device 114 may be configured to generate an authorization request 356 that includes the augmented value 354. The initial portion 210 of the user's account number indicates an issuer of the account, and thus may be used by the second computing device 114 to route the authorization request 356 to the appropriate system associated with the issuer of the account (e.g. the interaction authorization system 126). In some examples, the authorization request 356 may also include at least a portion of the other account-related information, such as the CSV. For example, the CSV may be included if the unique portion 212 of the account number was generated based on at least the reduced binary representation (e.g., the first randomly generated number) and the CSV (e.g., the second randomly generated number). In the above-described example and as shown in FIG. 3B, the augment process 352 is performed by the chip 110. In other examples (not shown), the second computing device 114 may store and execute the augment process 352. For example, the second computing device 114 may receive the value 306 from the chip 110 and generate the augmented value 354 by executing the augment process 352.

At least the augmented value 354 included in the authorization request 356 may be received as input to a duplication check process 358 performed by the interaction authorization system 126. The duplication check process 358 may determine whether or not the augmented value 354 has previously been included in an authorization request received for a historical interaction (e.g., whether or not the augmented value 354 is a duplicate). For example, using the augmented value 354, the duplication check process 358 may generate and submit a query 360 to the interaction history data store 130 to determine whether the augmented value 354 matches any augmented values associated with historical interactions that are stored in the interaction history data store 130. A query result 362 received from the interaction history data store 130 may indicate whether or not there is a match, and thus where or not the augmented value is a duplicate or a nonduplicate.

Determination that the augmented value is a duplicate may indicate that a fraudulent actor has obtained this augmented value 354 (e.g., using a skimmer device) and is fraudulently attempting to perform the interaction. Therefore, if the query result 362 indicates there is a match and the augmented value 354 is determined to be a duplicate, the duplicate status may be communicated to the authorization process 310 at step 363. In response, the authorization process 310 may generate an authorization message 364 for transmission to the second computing device 114. In this scenario, the authorization message 364 may indicate that the interaction is denied. That is, the authorization message 364 may include a decline code.

Alternatively, if the query result 362 indicates that there is no match and the augmented value 354 is determined to be a nonduplicate, at step 365, the augmented value 354 may be provided as input to a decoding process 366 of the interaction authorization system 126. The decoding process 366 may be configured to extract the value 306 from the augmented value 354 and provide the value 306 as output to the authorization process 310. In some examples, to separate the value 306 from the interaction-based identifiers, the decoding process 366 may utilize the known sequencing or scheme applied by the augment process 352 and/or may utilize an inverse function of the augment process 352.

Similar to the first exemplary process described with reference to FIG. 3A, upon receipt of the value 306, the authorization process 310 may use the value 306 to generate and submit the query 312 to the account information data store 128 to determine whether the value 306 matches any of the unique portions of account numbers stored in the account information data store 128. If the unknown user attempting to perform the interaction is indeed the user who opened the account associated with the biometric-based account number that has the unique portion 212 of the account number described with reference to FIG. 2, the value 306 may match the unique portion 212 from the plurality of unique portions of account numbers stored in the account information data store 128. However, if the unknown user is a fraudulent or unauthorized user (e.g., does not have any accounts with the account services provider that are associated with biometric-based account numbers), no matches for the value 306 may be determined. The query result 314 received from the account information data store 128 may indicate whether a match was determined, and the authorization message 364 responsive to the authorization request 308 may be generated accordingly.

For example, if the query result 314 indicates the value 306 matches one of the unique portions of account numbers (e.g., the unique portion 212), then the authorization message 364 may indicate that the interaction is approved. That is, the authorization message 364 may include an approval code. Alternatively, if the query result 314 indicates the value 306 does not match any of the unique portions of account numbers (e.g., indicative of fraud or unauthorized use), then the authorization message 364 may indicate that the interaction is denied. That is, the authorization message 316 may include a decline code.

Also similar to the first exemplary process described with reference to FIG. 3A, the interaction authorization system 126 may be configured to optionally perform the second encoding process 216 prior to performing the authorization process 310. In such examples, the value 306 extracted and output by the decoding process 366 may first be received as input to the second encoding process 216 to generate the second token 318 as output. The second token 318 may then be received as input to the authorization process 310, and used to query the account information data store 128 to determine whether or not the second token 318 matches any other token stored in the account information data store 128, such as the first token 218. The authorization message 364 may be generated based on the token-based match determination in a similar manner as described above for the value-based match determination.

Figures 4, 5:
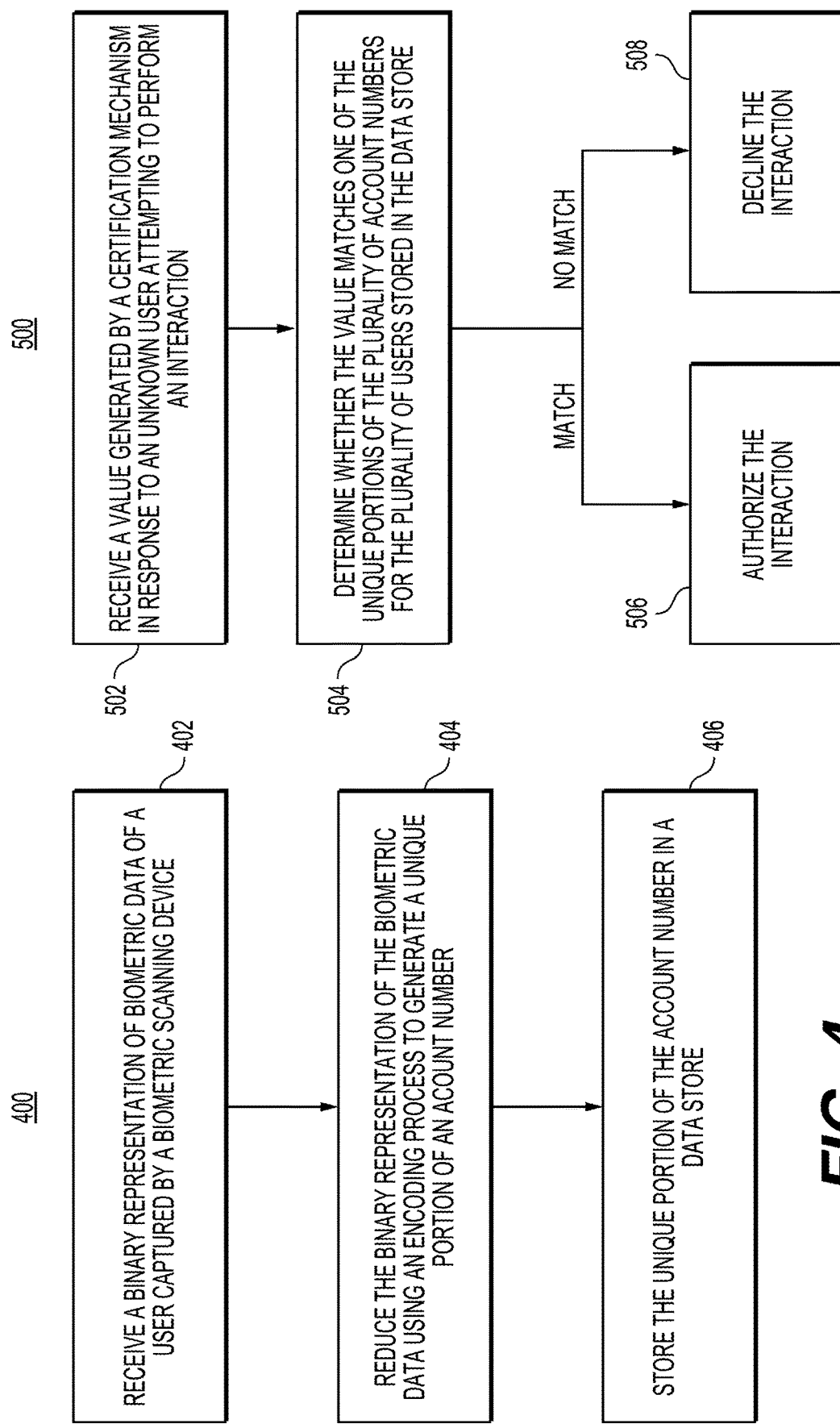
FIG. 4 depicts a flowchart of an exemplary process for generating a biometric-based account number, according to certain embodiments.
FIG. 5 depicts a flowchart of an exemplary process for authorizing an interaction performed using a biometric-based account number generated by the process of FIG. 4, according to certain embodiments.

FIG. 4 depicts a flowchart of an exemplary process 400 for generating a biometric-based account number. In some examples, the process 400 may be performed using one or more components in the environment 100 described in FIG. 1, such as the account generation system 124.

At step 402, the process 400 may include to receive, by the account generation system 124, the binary representation 204 of the biometric data 202 of the user captured by the biometric scanning device 104. As described in in detail above with reference to FIG. 2, the biometric scanning device 104 may capture the biometric data 202, generate the binary representation 204 of the biometric data 202, and provide the binary representation 204 to the account generation system 124 via the first computing device 102 associated with the biometric scanning device 104.

At step 404, the process 400 may include reducing the binary representation 204 of the biometric data 202 using the encoding process 112 (e.g., stored and executed by the account generation system 124) to generate the unique portion 212 of the account number for the user. In some examples, the reduced binary representation generated at step 404 is a first randomly generated number, and the encoding process 112 further generates the unique portion 212 of the account number based on a second randomly generated number. The second randomly generated number may be a CSV associated with the account number. In some examples, the encoding process 112 may use both the first and second randomly generated numbers to generate the unique portion 212 when the reduced binary representation is determined to be a duplicate (e.g., by the deduplication process 214).

At step 406, the process 400 may include to store the unique portion 212 of the account number in a data store, such as the account information data store 128. In some examples, the unique portion 212 of the account number may be converted to a token representative of the unique portion 212, such as the first token 218, prior to storage in the account information data store 128. For example, the unique portion 212 may be tokenized using the optional second encoding process 216 stored and executed by the account generation system 124. The account information data store 128 may store unique portions of a plurality of account numbers for a plurality of users (or a plurality of tokens if the optional second encoding process 216 is implemented) that are each generated using the above-described process 400.

An entirety of the account number may include the initial portion 210 and the unique portion 212 of the account number (e.g., the unique portion 212 being the remaining portion). The initial portion 210 of the account number may be generated by the account generation system 124 (e.g., using the BIN generation process 208). The initial portion 210 may be a BIN that represents an account type (e.g., credit card, debit card, etc.) and an issuer. In some examples, the account type may be further specific to accounts of a same type having biometric-based account numbers. Accordingly, the initial portion 210 may be common between the user and one or more other users having biometric-based account numbers associated with the issuer (e.g., the account services provider). In one non-limiting example, where the account number is a credit card number or a debit card number that includes 16 digits, an initial 6 digits of the account number are the initial portion 210, and a remaining 10 digits are the unique portion 212 of the account number.

Upon generation of the biometric-based account number, the certification mechanism 106 including the biometric scanning device 108 and the chip 110 with the encoding process 112 (e.g., the same encoding process stored and executed by the account generation system 124) stored thereon may be issued to the user. The certification mechanism 106 may enable the user to perform interactions using the biometric-based account number, as described below with reference to FIGS. 5 and 6.

Accordingly, certain embodiments may perform a generation of biometric-based account numbers. The process 400 described above is provided merely as an example, and may include additional, fewer, different, or differently arranged steps than depicted in FIG. 4.

FIG. 5 depicts a flowchart of an exemplary process 500 for authorizing an interaction performed using a biometric-based account number generated by the process 400 of FIG. 4. In some examples, the process 500 may be performed using one or more components in the environment 100 described in FIG. 1, such as the interaction authorization system 126.

At step 502, the process 500 may include receiving, by the interaction authorization system 126, the value 306 generated by the certification mechanism 106 in response to an unknown user attempting to perform an interaction using the certification mechanism 106. For example, the biometric scanning device 108 of the certification mechanism 106 may capture the biometric data 302 of the unknown user and generate the binary representation 304 of the biometric data 302. The encoding process 112 stored on the chip 110 may be executed to reduce the binary representation 304 received as input from the biometric scanning device 108 in order to generate the value 306. The value 306 may be received as part of the authorization request 308 transmitted via a terminal, such as the second computing device 114, that the unknown user presented the certification mechanism 106 to in order to perform the interaction.

In some examples, the chip 110 may optionally generate the augmented value 354 (e.g., using the augment process 352 stored on the chip 110), and the augmented value 354 may be received, as part of the authorization request 356, at step 502. When the augmented value 354 is received, one or more additional steps may be performed prior to the process 500 proceeding to step 504. For example, the augmented value 354 may be confirmed to be a nonduplicate via the duplication check process 358, and the value 306 may then be extracted or separated from the augmented value 354 via the decoding process 366. In example scenarios where the augmented value 354 is determined to be a duplicate, the interaction may be immediately declined (e.g., the process 500 may advance to step 508), as described in detail with reference to FIG. 3B.

At step 504, the process 500 may include to determine whether the value 306 matches one of the unique portions of the plurality of account numbers for the plurality of users stored in the account information data store 128. For example, the authorization process 310 may generate the query 312 using the value 306 to submit to the account information data store 128. The account information data store 128 may return the query result 314 indicating whether or not the value 306 matches one of the unique portions of the plurality of account numbers stored therein.

In some examples, when the account generation system 124 includes the optional second encoding process 216 that is configured to tokenize the unique portions of the plurality of account numbers prior to storage in the account information data store 128, the value 306 may be tokenized (e.g., to generate the second token 318) prior to step 504. In such examples, the second token 318 may be used to generate the query 312.

If the value 306 matches one of the unique portions of the plurality of account numbers stored in the account information data store 128 (or the second token 318 matches one of the plurality of tokens stored), then the process 500 may proceed to step 506, and the interaction may be authorized. For example, the value 306 may correspond to the unique portion 212. This match indicates that the unknown user attempting to perform the interaction using the certification mechanism 106 is indeed an actual account user having established a biometric-based account number with the account services provider (e.g., as opposed to a fraudulent or unauthorized user).

To authorize the interaction, an authorization message (e.g., similar to authorization message 316 or authorization message 364) that includes an approval code, for example, may be generated in response to the authorization request 308, 356 received at step 502. The authorization message 316, 364 may be transmitted to the second computing device 114, and upon reading the approval code, the second computing device 114, may enable performance (e.g., completion) of the interaction. For example, the interaction may be performed using the value 306 (e.g., corresponding to the unique portion 212) itself. In some examples, such as where the chip 110 is configured to generate and provide the augmented value 354 to the second computing device 114, the authorization message 316, 364 may include the value 306 in addition to the approval code to enable the value 306 to be used to perform the interaction.

If the value 306 does not match one of the unique portions of the plurality of account numbers stored in the account information data store 128 (or the second token 318 does not match one of the plurality of tokens stored), then the process 500 may instead proceed to step 508, and the interaction may be declined. The lack of a match indicates that the unknown user attempting to perform the interaction using the certification mechanism 106 is not an account user having established a biometric-based account number with the account services provider. For example, the unknown user may be a fraudulent or unauthorized user that stole or otherwise came into possession of the certification mechanism 106. To decline the interaction, the authorization message 316, 364 generated in response to the authorization request 308, 356 and transmitted to the second computing device 114 may instead include a decline code, for example. Upon reading the decline code, the second computing device 114, may decline the interaction.

Accordingly, certain embodiments may perform authorization of interactions performed using biometric-based account numbers. The process 500 described above is provided merely as an example, and may include additional, fewer, different, or differently arranged steps than depicted in FIG. 5.

Figure 6:
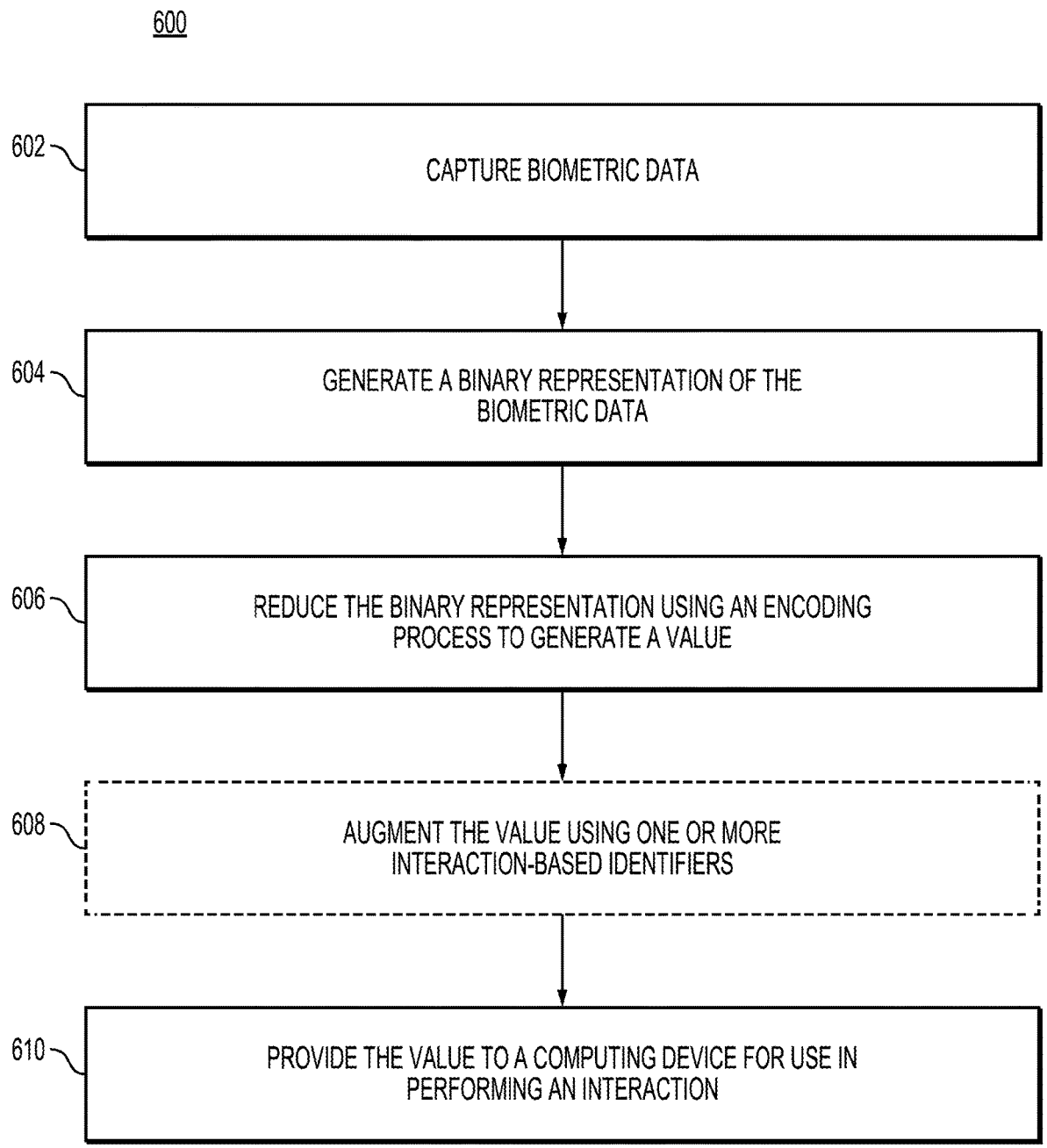
FIG. 6 depicts a flowchart of an exemplary process for using the biometric-based account number generated by the process of FIG. 4 to perform an interaction, according to certain embodiments.

FIG. 6 depicts a flowchart of an exemplary process 600 for using a biometric-based account number generated by the process 400 of FIG. 4 to perform an interaction. In some examples, the process 600 may be performed using one or more components in the environment 100 described in FIG. 1, such as the certification mechanism 106.

At step 602, process 600 may include to capture the biometric data 302 of a user. The user may be an unknown user attempting to perform an interaction at a terminal, such as the second computing device 114, using the certification mechanism 106 issued to a first user. The biometric scanning device 108 integrated in the certification mechanism 106 may capture the biometric data 302 as the user interacts with the biometric scanning device 108. At step 604, the biometric scanning device 108 may generate the binary representation 304 of the biometric data 302 captured at step 602 for provision to the chip 110 of the certification mechanism 106.

At step 606, the chip 110 may reduce the binary representation 304 using the encoding process 112 stored on the chip 110 to generate the value 306. At optional step 608, the chip 110 may augment the value using one or more interaction-based identifiers (e.g., to generate the augmented value 354) using the augment process 352.

At step 610, the chip 110 may provide the value 306 (or augmented value 354 if the optional step 608 is performed) to the second computing device 114 for use in performing the interaction. For example, the second computing device 114 may generate the authorization request 308, 356 that includes the value 306 (or augmented value 354 if the optional step 608 is performed) for transmission to the interaction authorization system 126. Upon receipt, the interaction authorization system 126 may execute at least the authorization process 310 to determine whether the value 306 matches one of the unique portions of the plurality of account numbers for the plurality of user stored in the account information data store 128, as described above in detail with reference to FIG. 5. In some examples, the interaction authorization system 126 may perform one or more additional processes, depending on whether the augmented value 354 is received and/or whether the unique portions of the account numbers are tokenized for storage in the account information data store 128. Based on the determination, the second computing device 114 may receive the authorization message 316, 364 that indicates the interaction has been authorized or declined (e.g., includes an approval or decline code). If the interaction has been authorized, the second computing device 114 may use the value 306 to complete the interaction.

Accordingly, certain embodiments may perform interactions using biometric-based account numbers. The process 600 described above is provided merely as an example, and may include additional, fewer, different, or differently arranged steps than depicted in FIG. 6.

In general, any process or operation discussed in this disclosure that is understood to be computer-implementable, such as the processes or operations depicted in FIGS. 2-6, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 7:
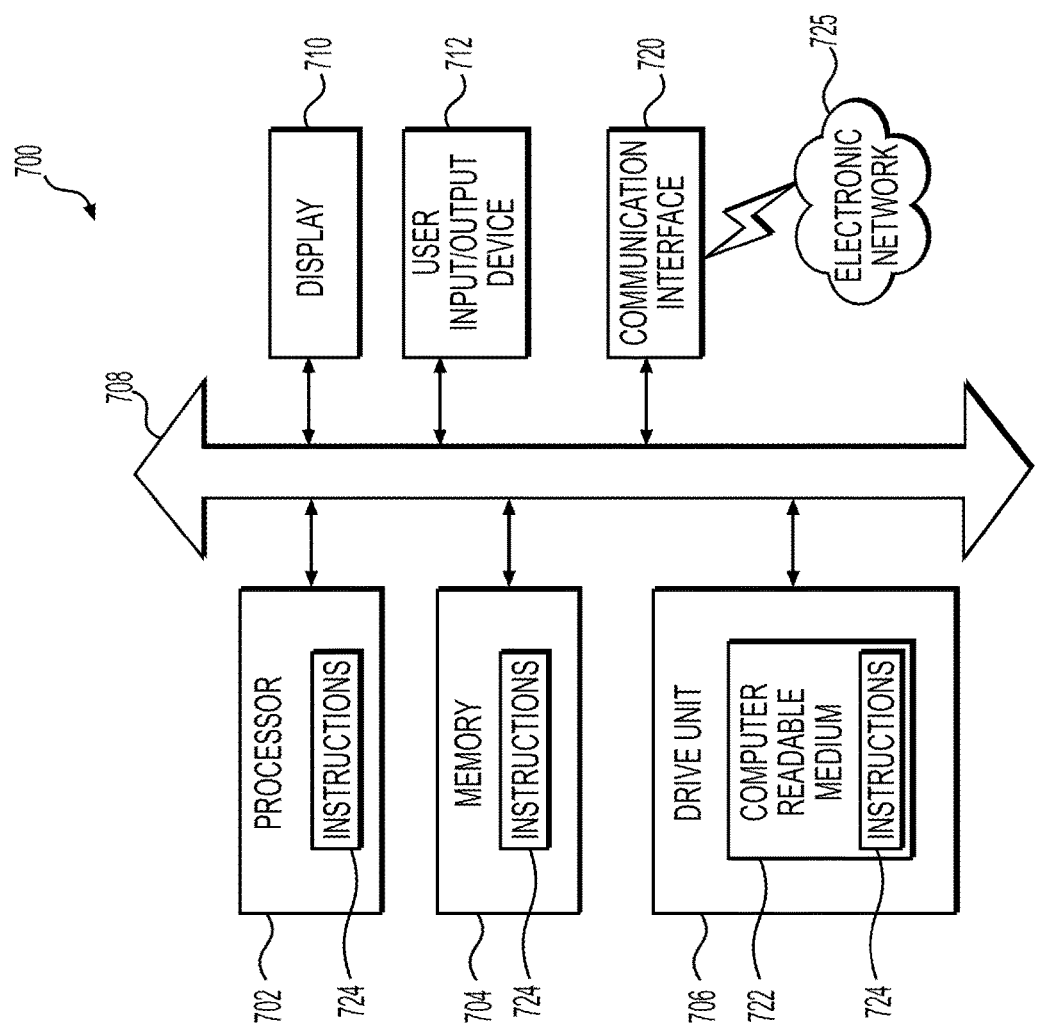
FIG. 7 depicts an example of a computer, according to certain embodiments.

FIG. 7 depicts an example of a computer 700, according to certain embodiments. FIG. 7 is a simplified functional block diagram of a computer 700 that may be configured as a device for executing processes or operations depicted in, or described with respect to, FIGS. 2-6, according to exemplary embodiments of the present disclosure. For example, the computer 700 may be configured as one of the first computing device 102, the certification mechanism 106, the second computing device 114, one of the server-side systems 118, and/or another device according to exemplary embodiments of this disclosure. In various embodiments, any of the systems herein may be a computer 700 including, e.g., a data communication interface 720 for packet data communication. The computer 700 may communicate with one or more other computers 700 using the electronic network 725. The electronic network 725 may include a wired or wireless network similar to the network 116 depicted in FIG. 1.

The computer 700 also may include a central processing unit ("CPU"), in the form of one or more processors 702, for executing program instructions 724. The program instructions 724 may include instructions for running the application associated with the account services system 120 to among other things, facilitate opening of an account and/or generation of a biometric-based account number for the account (e.g., if the computer 700 is the first computing device 102). The program instructions 724 may include instructions for running the encoding process 112 and/or optional augment process 352 (e.g., if the computer 700 is the certification mechanism 106). The program instructions 724 may include instructions for running one or more operations associated with facilitating interactions, such as generating and routing authorization requests 308, 356 as well as enabling and/or denying performance of the interaction based on authorization messages 316, 364 received in response to the authorization requests (e.g., if the computer 700 is the second computing device 114). The program instructions 724 may include instructions for running one or more operation of the server-side systems 118 (e.g., if the computer 700 is a server device or other similar computing device of one or more of the respective server-side systems 118). The computer 700 may include an internal communication bus 708, and a drive unit 706 (such as read-only memory (ROM), hard disk drive (HDD), solid-state disk drive (SDD), etc.) that may store data on a computer readable medium 722, although the computer 700 may receive programming and data via network communications. The computer 700 may also have a memory 704 (such as random access memory (RAM)) storing instructions 724 for executing techniques presented herein, although the instructions 724 may be stored temporarily or permanently within other modules of computer 700 (e.g., processor 702 and/or computer readable medium 722). The computer 700 also may include user input and output ports 712 and/or a display 710 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to issuing the certification mechanism 106 that is presented to a terminal by the user to use the biometric-based account number to perform an interaction, any suitable activity may be used.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for generating and using a biometric-based account number, comprising:
    receiving a binary representation of biometric data of a first user captured by a first biometric scanning device;
    reducing the binary representation of the biometric data of the first user using an encoding process;
    generating an account number usable to perform interactions associated with an account of the first user, the reduced binary representation output by the encoding process forming a unique portion of the account number, wherein the first user is provided a certification mechanism that enables the first user to use the account number to perform the interactions, and the certification mechanism includes (i) a chip storing the encoding process and not storing the biometric data of the first user and (ii) a second biometric scanning device;
    storing the unique portion of the account number in a data store; and
    in response to an attempt by an unknown user to perform an interaction using the certification mechanism:
        receiving, from a computing device that the certification mechanism is interacting with to perform the interaction, an authorization request including a value generated by the certification mechanism and provided to the computing device by the certification mechanism for inclusion in the authorization request, wherein the certification mechanism generates the value by (i) capturing biometric data of the unknown user using the second biometric scanning device, and (ii) reducing a binary representation of the captured biometric data of the unknown user using the encoding process executed by the chip;
        determining a match between the value and the unique portion of the account number stored in the data store, the match indicating the unknown user is the first user; and
        based on the match, transmitting an authorization message to the computing device, the authorization message authorizing the interaction such that the value matching the unique portion of the account number is used by the computing device to perform the interaction.

2. The computer-implemented method of claim 1, wherein the value generated by the certification mechanism is further based on at least one of an identifier of the computing device that the certification mechanism is interacting with to perform the interaction or a time stamp associated with the interaction, and the method further comprises:

applying a decoding process to separate the value into a first portion corresponding to the reduced binary representation of the biometric data of the unknown user and at least one of a second portion corresponding to the identifier of the computing device or a third portion corresponding to the time stamp.

3. The computer-implemented method of claim 1, wherein the account number further includes an initial portion of the account number that represents an account type and an issuer, and the method further comprises:

generating the initial portion of the account number, wherein the initial portion is common between the first user and one or more other users having biometric-based account numbers associated with the issuer.

4. The computer-implemented method of claim 3, wherein the account number is a credit card number or a debit card number, the account number includes 16 digits, an initial 6 digits of the account number are the initial portion, and a remaining 10 digits are the unique portion of the account number.

5. The computer-implemented method of claim 1, wherein the reduced binary representation of the biometric data of the first user is a first randomly generated number, and the method further comprises:

using the encoding process to generate the unique portion of the account number based on the first randomly generated number and a second randomly generated number.

6. The computer-implemented method of claim 5, further comprising:

determining whether the unique portion of the account number is a duplicate; and in response to determining the unique portion of the account number is a duplicate:

generating the second randomly generated number; and using the encoding process to generate the unique portion of the account number based on the first randomly generated number and the second randomly generated number.

7. The computer-implemented method of claim 6, wherein the second randomly generated number is a card security value (CSV).

8. The computer-implemented method of claim 1, wherein the certification mechanism does not include the unique portion of the account number stored on the chip.

9. A system for generating and using a biometric-based account number, the system comprising:

a certification mechanism provided to a first user that includes (i) a chip storing an encoding process and (ii) a first biometric scanning device, wherein the certification mechanism enables the first user to use an account number to perform interactions associated with an account of the first user, and wherein biometric data of the first user used to generate the account number is not stored on the certification mechanism; and a server device comprising:

at least one memory storing instructions, the instructions including the encoding process; and at least one processor operatively connected to the at least one memory and configured to execute the instructions to perform operations, including:

receiving, from a first computing device associated with a second biometric scanning device, a binary representation of the biometric data of the first user captured by the second biometric scanning device;

reducing the binary representation of the biometric data of the first user using the encoding process;

generating the account number usable to perform the interactions associated with the account, the reduced binary representation output by the encoding process forming a unique portion of the account number;

storing the unique portion of the account number in a data store; and in response to an attempt by an unknown user to perform an interaction using the certification mechanism:

receiving, from a second computing device that the certification mechanism is interacting with to perform the interaction, an authorization request including a value generated by the certification mechanism and provided to the second computing device by the certification mechanism for inclusion in the authorization request, wherein the certification mechanism generates the value by (i) capturing biometric data of the unknown user using the first biometric scanning device, and (ii) reducing a binary representation of the captured biometric data of the unknown user using the encoding process executed by the chip;

determining a match between the value and the unique portion of the account number stored in the data store, the match indicating the unknown user is the first user; and based on the match, transmitting an authorization message to the second computing device, the authorization message authorizing the interaction such that the value matching the unique portion of the account number is used by the second computing device to perform the interaction.

10. The system of claim 9, wherein the value generated by the certification mechanism is further based on at least one of an identifier of the second computing device that the certification mechanism is interacting with to perform the interaction or a time stamp associated with the interaction, and the operations further include:

applying a decoding process to separate the value into a first portion corresponding to the reduced binary representation of the biometric data of the unknown user and at least one of a second portion corresponding to the identifier of the second computing device or a third portion corresponding to the time stamp.

11. The system of claim 9, wherein the account number further includes an initial portion of the account number that represents an account type and an issuer, and the operations further include:

generating the initial portion of the account number, wherein the initial portion is common between the first user and one or more other users having biometric-based account numbers associated with the issuer.

12. The system of claim 9, wherein the reduced binary representation of the biometric data of the first user is a first randomly generated number, and the operations further include:

using the encoding process to generate the unique portion of the account number based on the first randomly generated number and a second randomly generated number, wherein the second randomly generated number is a card security value (CSV).

13. The system of claim 12, the operations further including:
   determining whether the unique portion of the account number is a duplicate; and
   in response to determining the unique portion of the account number is a duplicate:
      generating the second randomly generated number; and
      using the encoding process to generate the unique portion of the account number based on the first randomly generated number and the second randomly generated number.

14. The system of claim 9, wherein the data store is remote from the server device, and storing the unique portion of the account number in the data store comprises:
   generating a first token to represent the unique portion of the account number using a second encoding process; and
   storing the first token in the data store.

15. The system of claim 14, wherein determining the match comprises:
   generating a second token to represent the value using the second encoding process; and
   querying the data store using the second token, wherein the match determined between the value and the unique portion of the account number is based on a determination of a match between the second token and the first token stored in the data store.

16. The system of claim 9, wherein the certification mechanism does not include the unique portion of the account number stored on the chip.

17. A computer-implemented method for generating and using biometric-based account numbers, comprising:
   generating a plurality of account numbers for a plurality of users, wherein, for each of the plurality of users, the generating includes:
      receiving a binary representation of biometric data of the respective user captured by a first biometric scanning device associated with a first computing device;
      reducing the binary representation of the biometric data of the respective user using an encoding process;
      generating an account number usable to perform interactions associated with an account of the respective user, the reduced binary representation output by the encoding process forming a unique portion of the account number for the respective user; and
      storing the unique portion of the account number for the respective user in a data store such that the data store includes unique portions of the plurality of account numbers for the plurality of users;
   in response to an unknown user attempting to perform an interaction with a terminal using a second computing device associated with a user, from the plurality of users, receiving, from the terminal, an authorization request including a value generated by the second computing device and provided to the terminal by the second computing device for inclusion in the authorization request, wherein the second computing device generates the value by (i) capturing biometric data of the unknown user using a second biometric in scanning device of the second computing device, and (ii) reducing a binary representation of the captured biometric data of the unknown user using the encoding process stored in a memory of and executed by a processor of the second computing device, wherein the biometric data of the user associated with the second computing device is not stored in the memory of the second computing device;
   determining whether the value matches one of the unique portions of the plurality of account numbers for the plurality of users stored in the data store;
   when a match is determined, transmitting a first authorization message to the terminal, the first authorization message authorizing the interaction such that the value matching the one of the unique portions of the plurality of account numbers is used by the terminal to perform the interaction; and
   when a match is not determined, transmitting a second authorization message to the terminal, the second authorization message declining the interaction.

18. The computer-implemented method of claim 1, wherein the value generated by the certification mechanism and provided to the computing device by the certification mechanism for inclusion in the authorization request is an augmented value, and wherein the certification mechanism generates the augmented value by augmenting the value using one or more interaction-based identifiers provided by the computing device to the certification mechanism.

19. The computer-implemented method of claim 18, the method further comprising:
   performing a duplicate check process to determine whether the augmented value is a duplicate value that has been included in a previous authorization request received for a historical interaction, the duplicate value indicating fraud;
   based on the duplicate check process, determining the augmented value is a nonduplicate value; and
   extracting the value from the augmented value for use in determining the match.

20. The computer-implemented method of claim 19, wherein, based on the match, the authorization message transmitted to the computing device includes the value extracted from the augmented value.

* * * * *